United States Patent [19]

Seefluth

[11] 3,912,445

[45] Oct. 14, 1975

[54] MECHANISM FOR INSERTING HEATER IN PARISON WHICH MOVES IN ARCUATE PATH

[75] Inventor: Charles L. Seefluth, Bartlesville, Okla.

[73] Assignee: Phillips Petroleum Company, Bartlesville, Okla.

[22] Filed: Mar. 25, 1974

[21] Appl. No.: 454,273

[52] U.S. Cl. .................. 432/123; 432/224; 432/225
[51] Int. Cl.² ............................................. F27B 9/14
[58] Field of Search ........... 432/121, 122, 123, 224, 432/225

[56] References Cited
UNITED STATES PATENTS

| | | | |
|---|---|---|---|
| 2,548,683 | 4/1951 | Remington et al. | 432/123 |
| 2,586,348 | 2/1952 | Kuebler | 432/224 |
| 3,732,067 | 5/1973 | Young | 432/224 |
| 3,758,254 | 9/1973 | Dean | 425/383 B |

*Primary Examiner*—John J. Camby

[57] ABSTRACT

A vertically disposed open end parison is conveyed through a heating oven and thereafter additional heat is imparted to the interior of the upper open end thereof by a mechanism comprising means to lower a heater into the open end of the parison, which heater then follows the parison around an arcuate path after which it is withdrawn. Means are provided to return the heater to its original position preparatory to being lowered into the next successive parison. This allows imparting additional heat to the interior of the upper end of the parison which allows production of oriented hollow articles such as bottles having an improved seal without adversely affecting the strengthening orientation of the overall article.

9 Claims, 5 Drawing Figures

MECHANISM FOR INSERTING HEATER IN PARISON WHICH MOVES IN ARCUATE PATH

BACKGROUND OF THE INVENTION

This invention relates to an apparatus for heating a preformed hollow parison.

While the blow molding art goes back over 100 years, it has only been in the last 15 years or so that blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since the orientation occurs at a temperature below the crystalline melt point while the polymer is on a heating cycle, it was early recognized that little orientation could be effected in a conventional blow molding operation wherein a molten parison was extruded between mold havles and blown; first, the temperature of the parison could not be controlled closely enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally thus imparting orientation in a longitudinal direction and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength and, surprisingly, in the case of materials such as polypropylene, greatly improve optical properties.

However, since the optimum temperature for orientation is that just below the crystalline melt point of the material comprising the thermoplastic parison, it is apparent that special care must be taken in heating the parison. Furthermore, as a matter of economics, it is much preferred to form the parison preform simply by extruding a continuous length of tubing and severing said tubing to give individual parisons of a measured length, as opposed to injection molding a preform with an integral closed end. However, it has been found that the temperature at which maximum orientation occurs is below the optimum temperature for achieving the seal necessary to close one end of a parison formed by simply cutting sections from a continuous length of extruded tubing. Thus, while it is desired to have the parison substantially uniformly heated to a temperature just below the crystalline melting point, it is further desired to have the interior of the parison at the end where it is to be sealed at a slightly higher temperature, so that a true fusion seal can be achieved and an area which is to be pinched off to close one of the parison. Some plastic materials such as polyethylene terephthalate are particularly difficult to seal at orientation temperature.

SUMMARY OF THE INVENTION

It is an object of this invention to provide apparatus for heating a preformed hollow parison to a temperature where one end can be sealed and the parison walls strengthened by molecular orientation during a fabrication step; it is a further object of this invention to provide apparatus enabling the production of oriented closed end hollow articles from polymers which could otherwise not be sealed at the temperature required for strengthening orientation to occur; and it is yet a further object of this invention to provide a seal which can be trimmed flush with the bottom wall of the article being molded.

In accordance with this invention, a vertically disposed parison is conveyed through a heating oven and thereafter a heating means is lowered into one end thereof, which heating means travels with said parison through an arcuate path and is thereafter raised and returned to its starting postion.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
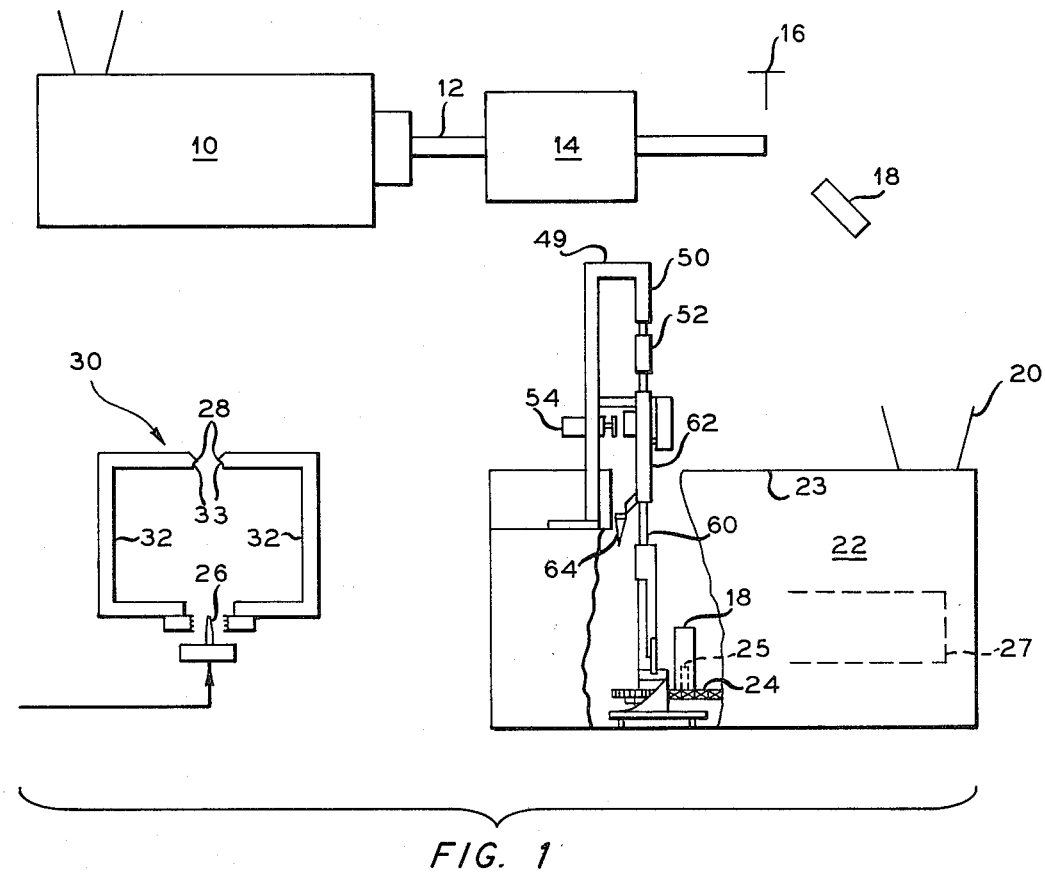
FIG. 1 is a schematic representation of an entire blow molding apparatus utilizing the heating mechanism of this invention.

The novel heating apparatus of the instant invention can be used in the heating of hollow thermoplastic parison preforms made, for instance, of any orientable thermoplastic materials such as polymers of at least one 1-olefin, said 1-olefin having 2 to 8 carbon atoms per molecule, poly(vinyl chloride), polyesters such as polyethylene terephthalate, and the like. Preferred 1-olefins are those selected from the group consisting of ethylene, propylene, butene, and mixtures thereof, more particularly, polypropylene.

These polymers can be formed into hollow parison preforms and cooled to a temperature below their crystalline freezing point. A presently preferred method of fabricating these preforms is simply to extrude a continuous length of tubing which is severed into individual parisons of the desired length. These hollow parison preforms in the solid state are then heated by means of the instant invention so that the bulk of the material being heated is brought to a substantially uniform temperature of about 1° to about 50° below the melting point of the thermoplastic material in the case of crystalline materials. The invention is also applicable to parisons of amorphous polymer or parisons of normally crystalline polymer which have been quenched to an amorphous state, the parison in these instances being heated to an orientation temperature of 40° to 225°F below the homogeneous melt point in the case of amorphous materials, or in the case of quenched normally crystalline materials the parisons being rather quickly reheated to 1 to 50°F below the temperature where crystals would melt after reforming.

The area exposed to the internal heating with the mechanism of this invention will generally be only the upper 5 to 40, preferably 10 to 25 percent of the interior surface of the parison. In this zone for a depth of 5 to 40 preferably 10 to 20 percent of the wall thickness of the parison, the thermoplastic is heated to a higher temperature, preferably to a molten condition. The remainder of the parison is at orientation temperature. The portion exposed to the internal heating mechanism of this invention will generally be heated to a temperature within the range of 1° to 50°F above the temperature of the remainder of the parison. Thus the heated end of the parison has an inner surface which is in a molten condition and thus susceptible of being sealed together when this end of the parison is pinched shut to provide a closed end perform which is thereafter blown out against the mold to form a high strength molecularly oriented blow molded article.

While the parisons which can be heated in accordance with this invention can vary in wall thickness, the thickness will generally be in the range of 75 to 300 mils. preferably 120 to 175 mils.

The instant invention is of particular utility in forming biaxially oriented hollow articles wherein open end hollow parison preforms are heated with the mechanism of this invention and thereafter transferred to a molding station where mold halves are closed at the upper end thereof to pinch the parison shut at a point just below where the means for transferring same have gripped the parison. Prior to the mold halves closing to seal and sever the upper end of the parison it is stretched longitudinally to impart longitudinal orientation by means of relative axial movement between the transfer means and neck forming means which grip the lower end; they are then caused to expand to conform to the shape of the mold by the application of a pressure differential between the interior of the parison and the mold wall, thus imparting circumferential orientation to give a biaxially oriented product. By thus molding the article in an upside down condition, the parison does not have to be inverted after being preferentially heated at the upper end thereof prior to transfer.

This orientation process imparts as much as a twenty fold increase in the strength of the plastic material. The small amount of material of the inner surface of the parison preform which is not at orientation temperature is not sufficient in quantity relative to the rest of the parison to have any appreciable affect on the improved strength imparted by the orientation process, and yet it effects a remarkable improvement in the overall process in that it allows closing the end of the parison by means of a simple pinching operation to give a good seal.

The oven and molding station can be a circulating air oven with supplementary radiant heaters of the type described in Dean, U.S. Pat. No. 3,758,254 issued Sept. 11, 1973, the disclosure of which is hereby incorporated by reference.

Figure 2:
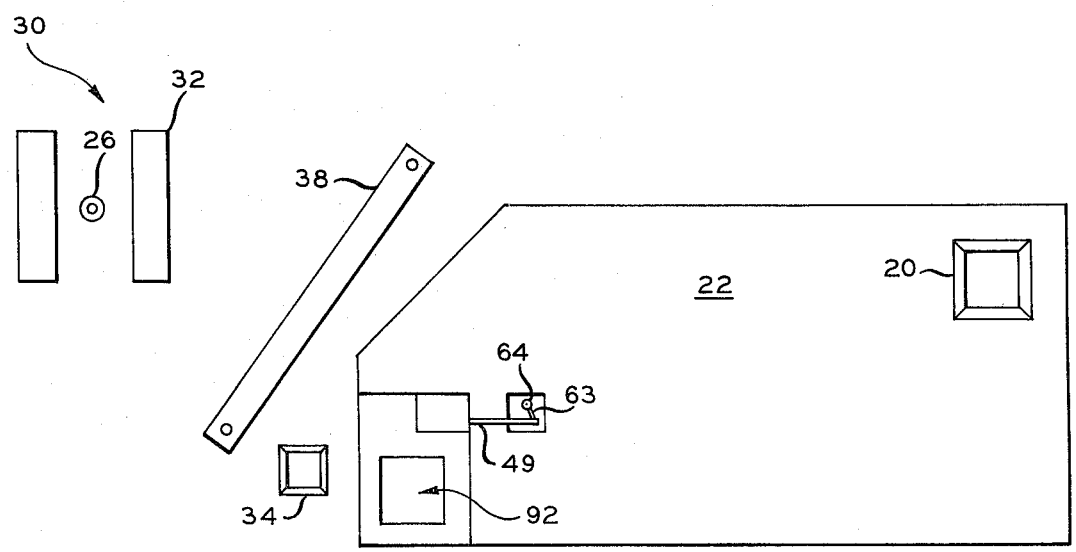
FIG. 2 is a top view of the heating and molding means of FIG. 1.

Referring now to the drawings, particularly FIGS. 1 and 2, there is shown a schematic representation of a blow molding apparatus utilizing the instant invention. Extruder 10 forms a tubular extrudate 12 which passes to cooling and sizing zone 14 and thence to cutting means 16 where it is cut into individual open end parison preforms 18 which fall into loading hopper 20 of oven 22. Oven 22 is a circulating air oven having a continuous chain 24 with spaced parison support means 25 for conveying parisons 18 therethrough in an upright or vertical manner.

Parison transfer mechanism generally described by reference character 38 (see FIG. 2) transfers the parisons after having been heated with the mechanism of this invention from oven 22 to the molding station generally designated by reference character 30. The lower open end of the transferred parison is inserted in neck forming means 26 and the upper end is closed off by sealing and severing means 28 as mold halves 32 come together. The severed end of the parison which is grasped by the jaws (not shown) carried by the end of transfer means 38 is dropped into scrap chute 34 as transfer means 38 returns to pick up the next parison. Transfer means 38 is not shown in FIG. 1 so as to better show the mechanism of this invention for inserting a heater into the interior of the parison. Supplemental radiant panels 27 aid in adjusting the parison to orientation temperature.

Figure 3:
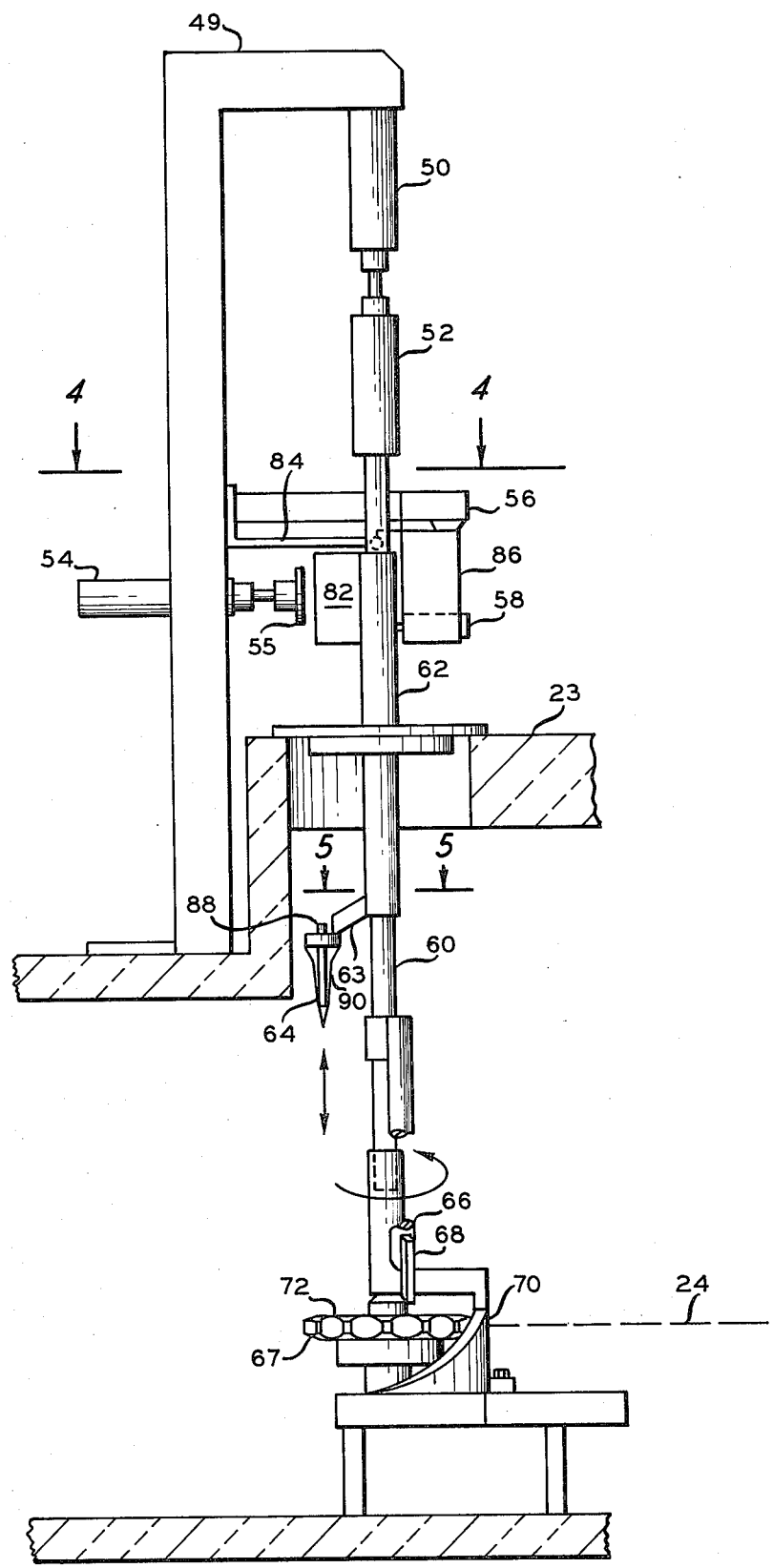
FIG. 3 is a view partially in section of the mechanism for inserting the heating means in the parison.

Referring now to FIG. 3, there is shown in detail the mechanism for inserting a heater into the upper end of the parison. Support arm 49 carries main shaft 60 which is concentric with gear 72. Also carried by arm 49 is cylinder 50 which axially reciprocates shaft 60 and thence heater carried sleeve 62 so as to sequentially lower heater assembly 64 into an open upper end of a parison and thereafter raise same out of the parison. Heater assembly 64 comprises cartridge radiant heater 88 and three guide wires 90, heater assembly 64 being attached to heater carrier sleeve 62 by means of heater assembly bracket 63. Cylinder 50 can be a conventional air cylinder or any other comparable means for producing reciprocal movement can be utilized in place thereof. Cylinder 50 is actuated to extend shaft 60 carrying heater assembly 64 into a parison carried by parison support means 25 (see FIG. 1) on chain 24. This causes index rod 66 to be inserted into the space between two teeth 67 of gear 72. This causes main shaft 60 and everything attached thereto to rotate. Since the distance between the axis of heater 88 and shaft 60 is equal to the distance between the axis of the parison and shaft 60 as the chain goes around sprocket 72, the heater assembly 64 within the parison travels in an arcuate path along with the parison as it goes around sprocket 72.

Figure 4:
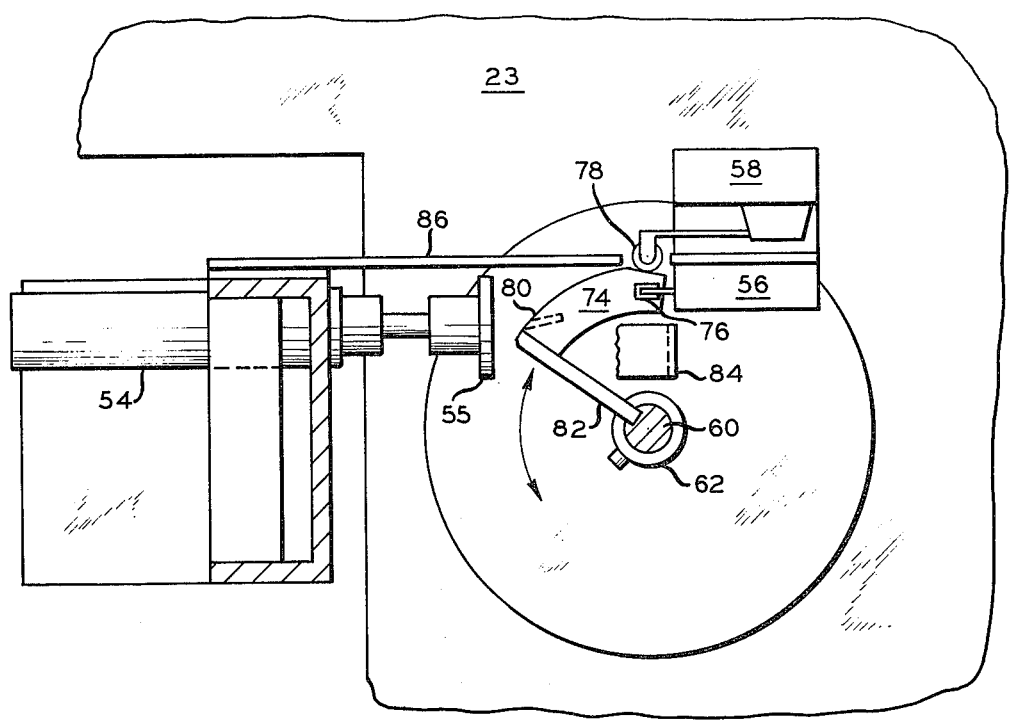
FIG. 4 is a view along section lines 4—4 of FIG. 3.

Viewing now FIG. 4 in connection with FIG. 3, it can be seen that at the end of the arcuate travel caused by index rod 66 being engaged in the teeth of gear 72, vertical control switch 58 is tripped which activates cylinder 90 to cause the heater assembly to be raised thus pulling index rod 66 out of the teeth to stop the rotation. When the cylinder has retracted the heating assembly to a preset point, lateral control switch 56 is tripped which signals lateral cylinder 54 which causes striker member 55 to push against cam carrier plate 82 thus rotating and returning the heater assembly into position over the next parison. The forward motion of cam carrier plate 82 is restrained by safety stop 84. At a preset point vertical control switch 58 activates cylinder 50 to cause same to lower shaft 60 carrying heating assembly 64 into the next parison. Lateral control switch 56 is tripped at the bottom of the travel of shaft 60 thus causing cylinder 54 to retract member 55. Lateral cam follower 76 rides on flat lateral control cam 74 and vertical cam follower 78 rides on curved vertical cam 80. The control switches are mounted on L shaped control switch mounting bracket 86.

Figure 5:
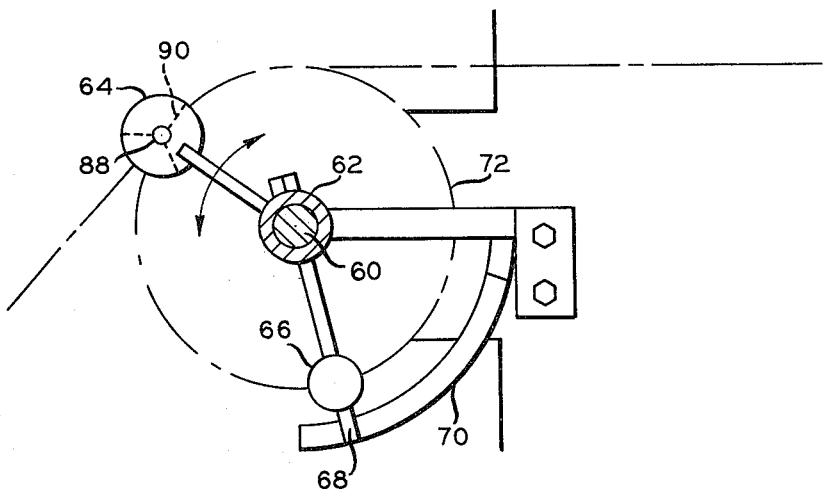
FIG. 5 is a view along section lines 5—5 of FIG. 3.

Referring now to FIG. 5, there is shown safety cam 70 and safety cam follower 68. In the event of a malfunction of vertical control switch 58 continued arcuate movement of shaft 60 carries safety cam follower 68 up so as to remove index rod 66 from the teeth to prevent damage to the equipment. The time the heater is in the parison is preferably one cycle of the machine which is about 5–12 seconds. Thereafter about 7 cycles transpire before the parison reaches the unloading station 92.

It is to be noted that other means for effecting the movements can be utilized. For instance, instead of cylinder 54, a spring biased cam carrier plate 82 could be utilized.

Because the seal formed is a true fusion seal, the bead formed by cavities 32 when members 28 sever the parison, leaving a short tab or bead between the bottom wall and the severing point, can be trimmed off. Alternatively, the forwardmost portions of the mold can be immediately adjacent the bottom so as to sever the parison flush with the bottom wall initially, although this is less preferred since it has been found that with polymer at orientation temperature, a much superior seal can be obtained by forming a bed along the exterior of the seal line. This causes some movement of the polymer in the area of the seal and some flow of polymer toward the interior of the article being molded, thus giving a superior seal even after the bead has been severed subsequent to the formation of the bottle.

Many conventional parts such as frame elements, bolts, shields, and the like have been omitted from the drawings for the sake of simplicity but their inclusion is well known by those skilled in the art and is within the scope of the invention.

EXAMPLE

Propylene homopolymer having a density of 0.905 (ASTM D 1505-63T), a melt index of 2 (ASTM D 1238-62T, Cond. L), and a crystalline melting point of about 340°F was extruded into tubing having an internal diameter of 0.8 inch and a wall thickness of 0.125 inch. The tubing was cooled to room temperature and cut into 5-inch lenghts. These 5-inch lengths were placed on pins and transferred through a heating oven for a time period of about 30 minutes. They were then conveyed around a sprocket and a Chromalox ¼ × 2-inch cartridge heater No. Cir.-1020 was lowered 1 inch into the upper open end of the parison. After the chain had made the arcuate path around the sprocket, the heater was withdrawn. Total time that the heater was in the parison was approximately 7 seconds. Approximately a 20 mil layer of the interior of the parison was melted. The remainder of the parison was at a temperature of about 228°F. After another 50 seconds travel on the chain to the unloading station the parison was thereafter grasped at the upper end thereof, raised out of the oven and transferred into position over a neck-forming plug and lowered onto the plug. Thereafter the jaw means closed to form threads on the lower end of the parison and mold halves closed to seal and sever the parison at the upper end thereof just below the point where it was gripped by the means which transferred it out of the oven. A true fusion seal was formed. Bottles were filled with tap water, capped and manually squeezed. This was repeated on numerous bottles made from parisons heated in accordance with the invention and the percent of bottles which leaked was zero. A knife was used to cut the seal area from the bottom of one of these bottles and the ends of the seal were cut off. The two parts were still stuck together and could not be pulled apart. Identical parisons formed in an identical manner except without the use of the heater in one end thereof were prepared and the bottom seal area cut out and the ends thereof cut off as noted hereinabove; the two sides readily came apart showing that there was not a true fusion seal. This shows that without the invention the seal formed is not a true fusion seal but rather is primarily the result of the two surfaces being mechanically held intimately together. Such seals, while quite good, do result in a small percentage of "leakers" whereas noted hereinabove, the bottles made in accordance with the invention had no "leakers".

While this invention has been described in detail for the purpose of illustration, it is not to be construed as limited thereby but is intended to cover all changes and modifications within the spirit and scope thereof.

What is claimed is:

1. Apparatus for heating a tubular parison comprising in combination: means for carrying a vertically disposed open end thermoplastic parison through a course in a heating oven and near a final portion of said course through an arcuate path; heating means adapted to be inserted into a top end of said parison; guide means to position said heating means in said parison; means to lower said heating means into said top end of said parison as said parison is near a beginning of said arcuate movement; means to move said thus lowered heating means through said arcuate path along with said parison; means to raise said heating means as said parison is near an end of said arcuate movement; and means to return said heating means to its original position.

2. Apparatus according to claim 1 wherein said means for carrying said parisons comprises an endless chain having a vertically disposed pins, which chain passes around a sprocket gear to form said arcuate path.

3. An apparatus according to claim 2 wherein said heating means is a cartridge heater having a plurality of vertically disposed wires radially positioned around same, said wires tapering toward a lower end thereof.

4. An apparatus according to claim 3 wherein said heating means is carried by a shaft concentric with said gear and wherein said means to move said heating element through an arcuate path comprises an index rod also carried by said shaft which index rod engages teeth of said gear when said shaft is lowered.

5. An apparatus according to claim 4 wherein said means to lower said heating means and said means to raise said heating means comprises a cylinder attached to said shaft and adapted to move said shaft up and down.

6. An apparatus according to claim 5 wherein said means to return said heating means to its original position comprises a cylinder having a striking member which pushes against a cam carrier plate to rotate said shaft back to its original position.

7. An apparatus according to claim 5 comprising in addition a safety cam concentric with said gear and a safety cam follower carried by said shaft and disposed so as to ride up on said safety cam to raise said index rod out of said gear on further arcuate movement past a preset point.

8. An apparatus according to claim 5 wherein said means to raise and lower said parison comprises in addition a flat vertical control cam attached by means of a cam carrier plate to said shaft having a vertical control microswitch with a vertical cam follower adapted to engage said flat vertical control cam to activate said means to return said heating means to its original position; and a lateral control microswitch having a horizontal cam follower adapted to contact a curved horizontal cam surface which is attached at right angles to said flat vertical control can to activate said means to raise and lower said heating means.

9. Apparatus according to claim 5 wherein said oven is a circulating air oven with supplemental radiant panels.

* * * * *